United States Patent Office 2,768,847
Patented Oct. 30, 1956

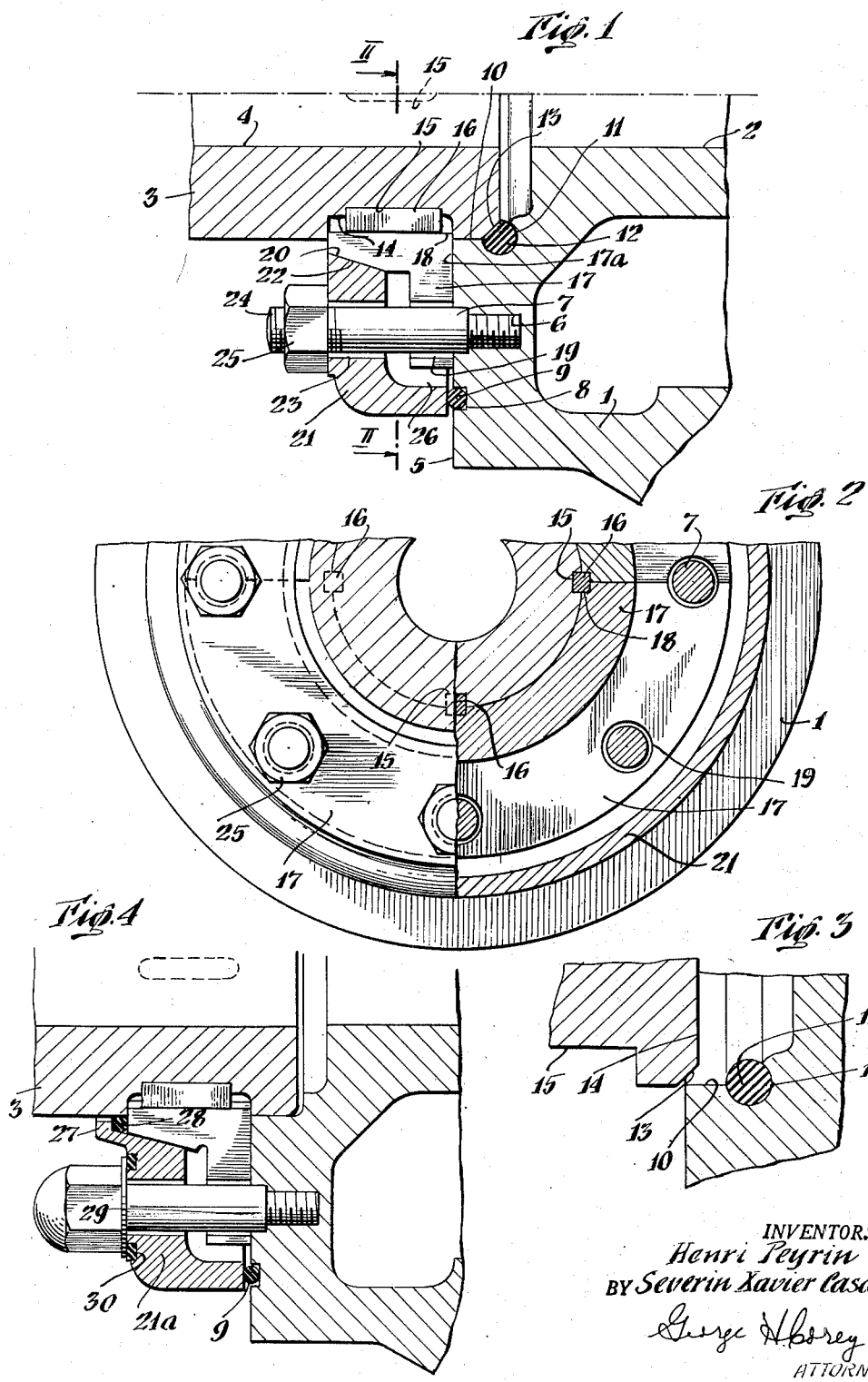

2,768,847

FLANGE RETAINED KEY DRIVE TYPE OF MECHANICAL COUPLING

Henri Peyrin and Severin Xavier Casacci, Grenoble, France, assignors to Etablissements Neyrpic, Grenoble, France, a corporation of France Application July 19, 1951, Serial No. 237,631

Claims priority, application France July 19, 1950

6 Claims. (Cl. 285—368)

The present invention relates to mechanical couplings between two rotating parts.

Conventional mechanical couplings between two rotating parts, such as two sections of a shaft or the like, usually employ plates or discs integral with or fastened to the ends of the parts. Where couplings are used with the plates or discs integral with the shaft, any elements which must encircle the shaft, such as bushings, thrust collars, gaskets, rings, etc., must be made in two or more pieces. This makes the manufacture of those elements complicated and reduces the precision of manufacture of the entire mechanism.

Several different types of couplings are known, having demountable plates or discs which permit the assembly of one-piece annular parts on the shaft. These demountable couplings have a substantial axial length, requiring an elongated shaft, with resulting inconvenience in the construction and assembly of a machine having such a coupling. Such inconveniences, and the difficulties encountered with couplings having integral plates, are both avoided by the use of couplings constructed in accordance with the present invention.

Such a coupling includes a demountable annular flange constructed from two or more separate removable segments, fitted and fixed by keys or other means within a peripheral groove cut near the end of the shaft to be coupled, these segments being retained in the groove by a removable annular ring. This annular flange forms an abutment or shoulder near the grooved end of the shaft. This abutment may cooperate with another abutment or plate of the conventional type or with another annular flange formed in a similar manner from removable segments. The ring which retains the segments is provided with suitable fastening means such as screws or bolts. By tightening these bolts, the positioning of the annular segments and the tightening of the coupling are accomplished at the same time.

The segments and the retaining ring are provided with complementary conical contact surfaces which produce an efficient and progressive tightening effect. This arrangement provides a coupling of the plate type which can be easily attached after the parts to be coupled are in position and which may be removed without disassembling the coupled pieces. This advantage is particularly desirable where the pieces to be coupled have aligned axial passages to permit the flow of fluids or the movement of internal parts previously assembled there, or where the disassembly of the coupled pieces is laborious or simply undesirable. This is especially true in the coupling of hydraulic turbine and alternator units where the shaft connecting the turbine and alternator is provided with a passage for apparatus which controls the orientation of the turbine vanes.

Besides facilitating the assembly and disassembly of the coupling, the present invention makes it possible to free the shaft entirely from any projection which would obstruct the sliding movement of a one-piece annular element for example, a bearing, along the shaft. Consequently such annular elements, when used on a shaft provided with such a coupling, need not be constructed in two or more pieces.

The attached drawings show by way of example, two embodiments of the present invention, as applied to the connection of a shaft or arbor with a rotating machine.

In the drawings:

Fig. 1 is a partial sectional view, taken through the longitudinal axis of a coupling constructed in accordance with the invention.

Fig. 2 is a fragmentary view, partly in elevation from the left end of Fig. 1 and partly in section along the line II—II of Fig. 1.

Fig. 3 is a sectional view on a much larger scale of a detail of the coupling of Figs. 1 and 2, showing the parts in a partially assembled position.

Fig. 4 is a partial sectional view, similar to Fig. 1, illustrating another embodiment of the invention.

The coupling shown in Fig. 1 connects a first rotatable element or shaft 1 having an internal cylindrical passage 2 with the end of a second rotatable element or arbor 3 having an axial passage 4.

The end of the shaft 1 is provided with a plane surface 5, having tapped holes 6 for receiving fastening studs 7. The plane surface 5 is also provided with an annular groove 8 for receiving a packing or gasket 9. Within the shaft 1 is formed a cylindrical recess surface 10 which terminates in an annular groove 11 for receiving a packing or gasket 12.

The gasket is held within its groove by a conical surface 13 formed on the periphery of the end of the arbor 3, which end is inserted in the recess 10. The gasket may be provided with a mating conical surface (see Fig. 1). Adjacent the end of the shaft 3, but spaced therefrom by an axial distance somewhat less than the depth of the recess 10, there is provided a groove 14, having in its bottom regularly spaced cross slots 15 for receiving keys 16. In the example shown, there are four such keys.

Two semi-annular segments 17, are fitted within the groove 14, these segments being provided with keyways 18 for receiving the keys 16. The sides of the two segments provide plane surfaces 17a which abut against the surface 5 of the shaft 1. The segments 17 are provided with apertures 19 for receiving the studs 7. On their sides opposite the plane surfaces 17a, the segments 17 have conical surfaces 20. A ring 21 encircles the segments 17 and is provided with a complementary conical surface 22. When the ring 21 is placed against the segments 17, the two conical surfaces 20 and 22 come in contact. The ring 21 has apertures 23 for receiving the studs 7 which extend through the apertures 19 in the segments 17 and are threaded into the holes 6. The studs 7 have threaded ends 24 to receive nuts 25 which abut against the ring 21.

Before the coupling of the shaft 1 to the arbor 3, the latter has no peripheral flange or projection, so that any annular element intended for mounting on the arbor can be readily assembled over its end. Such elements include bearings, thrust collars, etc. After assembling such elements on the arbor 3, the ring 21 is placed thereon. The two segments 17 are then placed within the groove 14, with the keys 16 in place in the keyways. The studs 7 are then screwed into their holes 6, through the apertures 19 in the segments 17. Upon applying the ring 21 over the two segments 17 the complementary conical surfaces 20 and 22 come in contact. The nuts 25 are then placed on the threaded ends of the studs. Upon tightening these nuts, the ring 21 is forced over the segments 17, the surfaces 20 and 22 form a wedge and tighten the segments 17 against the bottom of the slot 14. On continuing the tightening of the nuts 25, the assembled parts including the ring 21, the two segments 17 and the arbor 3 are moved toward the shaft 1 until the plane surfaces 17a and 5 come into contact. The conical surfaces may be locked or jammed by a slight additional tightening of the nuts 25, so as to assure a positive fastening of the assembly. The gasket 12 is thereby tightened between its groove 11 and the conical end 13 on the arbor 3, and provides a completely water-tight joint. Furthermore, the centering of the arbor 3 and the shaft 1 is effected by the engagement of the cylindrical end of the shaft 3 within the cylindrical recesses 10. The gasket 9 is tightened between its groove 8 and the ring 21, so as to tightly close the annular space 26 between the ring 21 and the segment 17 and also the clearance between the apertures 23 and the studs 7. These spaces may be filled with lubricant before the insertion and tightening of studs 7. This precaution permits the use of the coupling under water.

The ring 21 may have the form shown at 21a in Fig. 4. The ring 21a is provided with an inner flange 27 which serves as a seat for a gasket 28. The ordinary nut 25 of Fig. 1 is replaced in Fig. 4 by a nut 29 having a blind hole and a flange on its inner end which covers a gasket 30. The gasket 12 of Fig. 1 is no longer necessary in Fig. 4, because liquid tightness between the shaft 1 and the arbor 3 is assured by the cooperation of the gaskets 9, 28 and 30.

A coupling constructed in accordance with the invention is especially strong. It provides complete and permanent water tightness between the axial passages in the shaft 1 and the arbor 3, which is an important advantage when the interior passages of the coupled parts must be isolated from the outside (as when such passages carry oil supplies, or enclose reciprocating elements, etc.).

This is particularly true in the case of turbine and generator assemblies of the type consisting of a single submerged unit, such as are shown for example in the copending application of Jean Claude Guimbal, Serial No. 193,851, filed November 3, 1950, now Patent No. 2,634,375, issued April 7, 1953. In that type of unit, where the interior volume must be made as small as possible, all the parts must be constructed with very high precision. This is particularly true of the thrust bearing, in which most of the elements must be built in one piece as shown in copending application of the present inventors, Serial No. 236,002, filed July 10, 1951, now Patent No. 2,733,892, issued February 7, 1956. The use of such one piece bearing structures is not possible without a demountable coupling for the parts of the shaft.

The use of a coupling in accordance with the invention makes it possible to construct the turbine and generator assembly with a streamlined form having low resistance to the flow of water, due to the reduction of the axial length which is possible when such a coupling is used.

It should be understood that the invention is not limited to the particular forms shown and described herein. In particular, the keying of the segments in the groove of the arbor may be accomplished with two symmetrically located keys instead of four or again it may be done with notches or projections of suitable form. The attachment of the ring to the shaft may be effected by threaded bolts and nuts, etc. The elastic gaskets may be tightened between the arbor and the shaft against seats or grooves of any suitable form. These gaskets may be completely eliminated if it is not necessary to have a watertight coupling. As pointed out above, the integral flange 21 carried on the shaft 1 may be replaced by a demountable flange constructed from several segments such as the segments 17, assembled in a similar maner.

We claim:

1. A mechanical torque transmitting coupling comprising a first element rotatable on an axis, a second element to be coupled to said first element in end to end aligned relation to said first element along said axis and for rotation with said first element on said axis, said first element at the end thereof adjacent said second element providing a portion extending generally outwardly from said first element with respect to said axis beyond said second element, said second element having an external groove adjacent said first element extending circumferentially about said axis and providing axially spaced end surfaces of said groove, an arcuate segment disposed in said groove and extending about said axis and supported for movement of said segment in said groove inwardly and outwardly toward and away from said axis of rotation in engagement with said end surfaces of said groove, means operatively connecting said outwardly extending portion of said first rotatable element to said segment for securing said segment against rotative movement thereof relative to said first rotatable element while providing for said inward and outward movement of said segment, a securing element disposed within said groove of said second rotatable element between said axially spaced end surfaces of said groove and engaging axially extending generally radial surfaces of said second element and the portion of said segment disposed within said groove for securing said segment against rotative movement of said segment relative to said second rotatable element, thereby to secure driving rotation of one of said rotatable elements upon rotation of the other, and means operatively connecting said first rotatable element to said segment and operable to effect movement of said segment engaging said end surfaces of said groove together with said second rotatable element along said axis toward said first rotatable element and concomitant movement of said segment inwardly toward said axis to secure said engagement of said securing element with said segment and said second rotatable element.

2. A mechanical torque transmitting coupling comprising a first element rotatable on an axis, a second element to be coupled to said first element in end to end aligned relation to said first element along said axis and for rotation with said first element on said axis, said first element at the end thereof adjacent said second element providing a portion extending generally radially outwardly with respect to said axis beyond said second element, said second element having an external groove adjacent said first element extending circumferentially about said axis, said groove providing a bottom surface concentric with said axis and providing annular end surfaces thereof spaced along said axis from each other and disposed in planes generally perpendicular to said axis, a plurality of arcuate segments disposed in said groove in circumferentially spaced positions about said axis with respect to each other, said segments each having end surfaces spaced along said axis with respect to each other and disposed in planes generally perpendicular to said axis, said end surfaces of said segments extending into said groove adjacent and for bearing against said end surfaces of said groove to restrain said segments against movement thereof relative to said second rotatable element parallel to said axis of rotation while providing for generally radial movement of said segments inwardly and outwardly toward and away from said axis of rotation, said segments each providing an outer surface inclined with respect to said axis in the direction outwardly from said axis and toward said first rotatable element, a ring extending about said second rotatable element generally co-axial therewith adjacent said segments and having an inner surface inclined generally in the direction outwardly from said axis toward said first rotatable element, means engaging said ring and said outwardly extending portion of said first rotatable element and operable to move said inclined surface of said ring into engagement with said inclined surfaces of said segments to urge said segments generally radially inwardly toward said axis of rotation while said segments are restrained against movement of said segments parallel to said axis relative to said second rotatable element, means engaging said segments and said first rotatable element to prevent rotative movement of said segments with respect to said first rotatable element, and securing elements disposed within said groove and engaging said second rotatable element at said bottom surface of said groove and engaging the portions of the respective segments disposed within the groove to prevent rotative movement of said segments relative to said second rotatable element, thereby to effect driving rotation of one of said rotatable elements upon rotation of the other.

3. A mechanical torque transmitting coupling comprising a first element rotatable on an axis, a second element to be coupled to said first element in end to end aligned relation to said first element along said axis and for rotation with said first element on said axis, said first element at the end thereof adjacent said second element providing a portion extending generally outwardly from said first element with respect to said axis beyond said second element, said second element having an external groove adjacent said first element extending circumferentially about said axis, said groove having annular end surfaces spaced along said axis from each other and disposed in planes transverse to said axis, an arcuate segment disposed in said groove and having end surfaces spaced along said axis with respect to each other and disposed in planes transverse to said axis, said end surfaces of said segment extending into said groove adjacent and for bearing engagement against said end surfaces of said groove to restrain said segment against movement thereof relative to said second rotatable element parallel to said axis of rotation while providing for movement of said segment inwardly and outwardly toward and away from said axis of rotation, a ring extending about said second rotatable element generally co-axial therewith and engaging said segment for effecting movement of said segment along said axis upon movement of said ring toward said first rotatable element, means operatively connecting said outwardly extending portion of said first rotatable element to said ring and operable to effect said movement of said ring toward said first rotatable element for effecting movement of said segment and said second rotatable element with said end surfaces of said segment and of said groove in engagement along said axis toward said first rotatable element, said ring being operatively connected to said segment for effecting said movement of said segment inwardly toward said axis upon operation of said means to effect said movement of said ring toward said first rotatable element, means operatively connecting said segment to said first rotatable element to prevent rotative movement of said segment with respect to said first rotatable element, and a securing element having surfaces with axially and radially extending dimensional components and engaging complementary surfaces of said second rotatable element and the portion of said segment disposed within said groove for securing said segment against rotative movement of said segment with respect to said second rotatable element while providing for said inward and outward movement of said segment, said ring having an outer peripheral flange extending generally parallel to said axis toward said outwardly extending portion of said first rotatable element, said flange having an edge surface transverse to said axis, an annular gasket disposed between said edge surface of said peripheral flange and said outwardly extending portion of said first rotatable element for sealing said ring against said first rotatable element upon operation of said means effecting movement of said ring toward said first rotatable element said ring having an inner flange extending therefrom generally inwardly toward said second rotatable element adjacent said segment and at the opposite side of said segment from said first rotatable element, and a second gasket encircling said second rotatable element and disposed between said inner flange and said segment and pressed against said segment upon operation of said means operable to move said ring toward said first rotatable element.

4. A mechanical torque transmitting coupling comprising a first element rotatable on an axis, a second element to be coupled to said first element in end to end aligned relation to said first element along said axis and for rotation with said first element on said axis, said first element at the end thereof adjacent said second element providing a portion extending generally outwardly from said first element with respect to said axis beyond said second element, said second element having an external groove adjacent said first element extending circumferentially about said axis, said groove having a bottom surface extending about and generally along said axis and having an annular end surface adjacent said first rotatable element and disposed in a plane generally perpendicular to said axis, a plurality of arcuate segments disposed in said groove in circumferentially spaced positions about said axis with respect to each other, said segments having end surfaces disposed in a common plane generally perpendicular to said axis, said end surfaces of said segments extending into said groove in bearing engagement against said end surface of said groove, said plurality of arcuate segments as an annulus providing a generally conical outer surface co-axial with and tapering toward said axis of rotation of said rotatable elements in the direction along said axis from said first rotatable element toward said second rotatable element, a ring extending about said second rotatable element generally co-axial therewith and having an inner conical surface co-axial with and tapering toward said axis of rotation in the direction along said axis from said first rotatable element toward said second rotatable element for engagement of said inner conical surface with said conical surface of said annulus of segments, means engaging said outwardly extending portion of said first rotatable element and engaging said ring and operable to move said ring toward said first rotable element with said tapering surfaces in engagement to urge said segments generally radially inwardly toward said axis of rotation with said end surfaces of said groove in engagement, said second rotatable element providing respectively adjacent said segments keyways extending along said axis and formed in the bottom surface of said groove, said segments respectively having therein at the portion thereof adjacent said bottom surface of said groove keyways extending along said axis registering with the respective keyways in said second rotatable element, keys disposed in said registering keyways for securing the respective segments against rotative movement thereof relative to said second rotatable element, and means engaging said arcuate segments and engaging said first rotatable element for securing said segments against rotative movement of said segments relative to said first rotatable element while providing for said movement of said segments inwardly toward said axis with respect to said first rotatable element upon operation of said operable means to press said segments into engagement with said keys, whereby driving rotation of one of said rotatable elements is effected upon rotation of the other rotatable element.

5. A mechanical torque transmitting coupling as defined in claim 4 in which said first rotatable element is provided with an end surface disposed toward said second rotatable element and in a plane perpendicular to said axis of rotation, said end surfaces of said arcuate segments that are disposed in said common plane perpendicular to the axis being disposed adjacent said plane surface of said first rotatable element and brought into bearing engagement therewith upon operation of said operable means.

6. A mechanical torque transmitting coupling comprising a first element rotatable on an axis, a second element disposed in end to end aligned relation to said first element along said axis for rotation with said first element on said axis, said second element having an external groove adjacent said first element and extending circumferentially about said axis, said groove providing a surface transverse to and extending about said axis and disposed toward said first rotatable element with respect to the groove, an arcuate segment disposed in said groove and extending about said axis and providing a surface transverse to said axis and engaging said transverse surface of said groove for effecting movement of said second rotatable element toward said first rotatable element upon movement of said segment along said axis toward said first rotatable element, means operatively connecting said first rotatable element to said segment for securing said segment against rotative movement of said segment relative to said first rotatable element while providing for movement of said segment in said groove inwardly and outwardly toward and away from said axis with said transverse surfaces in engagement, means operatively connecting said first rotatable element to said segment and operable to effect movement of said segment engaging said transverse surface of said groove together with said second rotatable element along said axis toward said first rotatable element and concomitant movement of said segment inwardly toward said axis upon said movement of said segment along said axis, and a securing element disposed within said groove having a surface with axially and radially extending dimensional components and engaging complementary surfaces of each of said second rotatable element and the portion of said segment disposed within said groove for securing said segment against rotative movement of said segment with respect to said second rotatable element while providing for said inward and outward movement of said segment.

References Cited in the file of this patent
UNITED STATES PATENTS

| Number | Name | Date |
|---|---|---|
| 448,966 | Lawless | Mar. 24, 1891 |
| 459,907 | Hogan | Sept. 22, 1891 |
| 789,222 | Lovekin | May 9, 1905 |
| 1,924,657 | Saine | Aug. 19, 1933 |
| 2,108,848 | Engel | Feb. 22, 1938 |
| 2,360,732 | Smith | Oct. 17, 1944 |
| 2,533,868 | Anderson | Dec. 12, 1950 |